US009875302B2

(12) United States Patent
Ni et al.

(10) Patent No.: US 9,875,302 B2
(45) Date of Patent: *Jan. 23, 2018

(54) MINING MULTILINGUAL TOPICS

(71) Applicant: MICROSOFT TECHNOLOGY LICENSING, LLC, Redmond, WA (US)

(72) Inventors: Xiaochuan Ni, Beijing (CN); Jian-Tao Sun, Beijing (CN); Zheng Chen, Beijing (CN); Jian Hu, Beijing (CN)

(73) Assignee: Microsoft Technology Licensing, LLC, Redmond, WA (US)

(*) Notice: Subject to any disclaimer, the term of this patent is extended or adjusted under 35 U.S.C. 154(b) by 227 days.

This patent is subject to a terminal disclaimer.

(21) Appl. No.: 14/471,334

(22) Filed: Aug. 28, 2014

(65) Prior Publication Data

US 2015/0046459 A1    Feb. 12, 2015

Related U.S. Application Data

(63) Continuation of application No. 12/760,844, filed on Apr. 15, 2010, now Pat. No. 8,825,648.

(51) Int. Cl.
*G06F 7/00* (2006.01)
*G06F 17/30* (2006.01)
*G06F 17/27* (2006.01)

(52) U.S. Cl.
CPC ...... *G06F 17/30705* (2013.01); *G06F 17/277* (2013.01); *G06F 17/30386* (2013.01); *G06F 17/30731* (2013.01)

(58) Field of Classification Search
CPC ......... G06F 17/30616; G06F 17/30702; G06F 17/30731; G06F 17/30277; G06F 17/277
See application file for complete search history.

(56) References Cited

U.S. PATENT DOCUMENTS

| | | | |
|---|---|---|---|
| 5,418,951 A | 5/1995 | Damashek | |
| 6,006,221 A | 12/1999 | Liddy et al. | |
| 6,385,611 B1* | 5/2002 | Cardona | |
| 6,990,628 B1 | 1/2006 | Palmer et al. | |
| 7,024,407 B2 | 4/2006 | Bradford | |
| 7,814,103 B1 | 10/2010 | Gravano et al. | |
| 7,984,034 B1 | 7/2011 | Shaw | |
| 8,204,736 B2 | 6/2012 | Emam et al. | |
| 8,438,009 B2 | 5/2013 | Amini et al. | |
| 2003/0018617 A1 | 1/2003 | Schwedes | |
| 2003/0187809 A1* | 10/2003 | Suermondt et al. | ............ 706/46 |
| 2005/0021517 A1 | 1/2005 | Marchisio | |

(Continued)

OTHER PUBLICATIONS

Business Statistics, by Sharma, J.K., 2nd ed. (2007) Dorling Kindersley. ISBN 978-81-7758-654-1. pp. 31, 40, 41. Selections provided from Google Books.*

(Continued)

*Primary Examiner* — Marc Somers
(74) *Attorney, Agent, or Firm* — Schwegman Lundberg & Woessner, P.A.

(57) ABSTRACT

Techniques for utilizing data mining technology to extract universal topics with multilingual representations from a multilingual database, and to organize existing or new documents in different languages by analyzing their respective topic distributions.

18 Claims, 9 Drawing Sheets

(56) References Cited

U.S. PATENT DOCUMENTS

| | | | |
|---|---|---|---|
| 2005/0165753 A1* | 7/2005 | Chen | G06F 17/30867 707/3 |
| 2007/0118498 A1* | 5/2007 | Song et al. | 707/1 |
| 2007/0185901 A1* | 8/2007 | Gates | G06F 17/3071 707/102 |
| 2008/0005137 A1* | 1/2008 | Surendran et al. | 707/101 |
| 2008/0249786 A1 | 10/2008 | Oldham et al. | |
| 2009/0024599 A1 | 1/2009 | Tata | |
| 2009/0024613 A1 | 1/2009 | Niu et al. | |
| 2009/0254884 A1* | 10/2009 | Rama et al. | 717/124 |
| 2010/0077301 A1* | 3/2010 | Bodnick et al. | 715/274 |
| 2010/0082511 A1 | 4/2010 | Niu et al. | |
| 2011/0302163 A1* | 12/2011 | Rhinelander et al. | 707/737 |
| 2012/0101965 A1* | 4/2012 | Hennig et al. | 706/12 |

OTHER PUBLICATIONS

Adar, Skinner, Weld, "Information Arbitrage Across Multi-lingual Wikipedia", retrieved on Feb. 25, 2010 at <<http://delivery.acm.org/10.1145/1500000/1498813/p94-adar.pdf?key1=1498813&key2=8372807621&coll=GUIDE&dl=GUIDE&CFID=77622692&CFTOKEN=70494628>>, ACM, Proceedings of Conference on Web Search and Data Mining (WSDM), 2009, pp. 94-103.

Bian, Teng, "Integrating Query Translation and Text Classification in a Cross-Language Patent Access System", retrieved on Feb. 25, 2010 at <<http://research.nii.ac.jp/ntcir/workshop/OnlineProceedings7/pdf/NTCIR7/C3/PATMN/03-NTCIR7-PATMN-BianG.pdf>>, Proceedings of NII Test Collection for IR Systems Workshop (NTCIR), Dec. 16, 2008, pp. 341-346.

Blei, et al., Latent Dirichlet Allocation, Jouranl of Machine Learning Research 3, Jan. 2003, pp. 30.

Boulis, "Topic Learning in Text and Conversational Speech", University of Washington, Doctoral Dissertation, 2005, 162 pgs.

Chau, Yeh, "A multilingual text mining approach to web cross-lingual text retrieval", retrieved on Feb. 25, 2010 at <<http://ws.csie.ncku.edu.tw/login/upload/2005/paper/A%20multilingual%20text%20mining%20approach%20to%20web%20cross-lingual%20text%20retrieval%2004110319040720855.pdf, Elsevier, Knowledge-Based Systems, vol. 17, No. 5-6, 2004, pp. 219-227.

Chau, et al., "A Neural Network Model for Hierarchical Multilingual Text Categorization", Advances in Neural Networks ISNN 2005 Second International Symposium on Neural Networks Proceedings Part II Lecture Notes in Computer Science, vol. 2, No. 3497, May 2005, pp. 238-245.

Chau, et al., "Filtering Multilingual Web Content Using Fuzzy Logic and Self-Organizing Maps", Journal of Neural Computing and Applications, vol. 13, Issue 2, Jun. 2004, pp. 140-148.

Chau et al., "Filtering multilingual Web content using fuzzy logic and self-organizing maps." IN: Neural Computing & Applications, vol. 13, No. 2., Jun. 2004, 9 pages.

Chau et al., "Fuzzy Multilingual Information filtering", IEEE Xplore, IN FUZZ, Jun. 2003. 5 pages.

Cohn, et al., "The Missing Link—A Probabilistic Model of Document Content and Hypertext Connectivity", MIT Press, Information Retrieval, vol. 13, 2001, pp. 430-436.

Fukuhara, Kimura, Arai, Yoshinaka, Masuda, Utsuro, Nakagawa, "KANSHIN: A Cross-lingual Concern Analysis System using Multilingual Blog Articles", retrieved on Feb. 24, 2010 at <<http://ieeexplore.ieee.org/stamp/stamp.jsp?tp=&arnumber=4627236>>, IEEE Computer Society, Workshop on Information-Explosion and Next Generation Search, 2008, pp. 83-90.

Heidel, et al., "Language Model Adaptation Using Latent Dirichlet Allocation and an Efficient Topic Inference Algorithm", In the Proceedings of the 8th Annual Conference of the International Speech Communication Association, 2007, pp. 2361-2364, 4 pgs.

Jagarlamudi, Daume III, "Extracting Multilingual Topics from Unaligned Comparable Corpora", retrieved on Feb. 25, 2010 at <<http://www.cs.utah.edu/~hal/docs/daume10multilingual.pdf, pp. 1-12.

Jijkoun, de Rijke, "WiQA: Evaluating Multi-lingual Focused Access to Wikipedia", retrieved on Feb. 25, 2010 at <<http://research.nii.ac.jp/ntcir/ntcir-ws6/OnlineProceedings/EVIA/3.pdf>>, Workshop on Evaluating Information Access (EVIA), May 15, 2007, pp. 54-61.

Kohler, "Multilingual phone models for vocabulary-independent speech recognition tasks", 2001, Available at:Elsevier. IN:Speech Communication, vol. 35, Issues 1-2, 10 pages.

Larkey, et al., "Language-Specific Models in Multilingual Topic Tracking", ACM Press, In the Proceedings of the 27th Annual International Conference on Research and Development in Information Retrieval, 2004, pp. 402-409.

Mimno, et al., "Polylingual Topic Models", In the Proceedings of the 2009 Conference on Empirical Methods in Natural Language Processing, 2009, pp. 880-889.

Murray, "Summarization by Latent Dirichlet Allocation: Superior Sentence Extraction through Topic Modeling", 2009, <<http://www.kentonmurray.com/thesis/thesis.pdf., 81 pages.

Ni, Sun, Hu, Chen, "Mining Multilingual Topics from Wikipedia", retrieved on Feb. 25, 2010 at <<http://delivery.acm.org/10.1145/1530000/1526904/p1155-ni.pdf?key1=1526904&key2=5592107621&coll=GUIDE&dl=GUIDE&CFID=79255907&CFTOKEN=85073060>>, ACM, Proceedings of Conference on World Wide Web (WWW), Apr. 23, 2009, pp. 1155-1156.

Office Action for U.S. Appl. No. 12/760,844, dated Dec. 9, 2011, Xiaochuan Ni, "Mining Multilingual Topics", 18 pgs.

Office action for U.S. Appl. No. 12/760,844, dated May 30, 2012, Ni et al., "Mining Multilingual Topics", 14 pages.

Potthast et al., "A Wikipedia-Baed Multilingual Retrieval Model", Springer-Verlag Berlin Heidelberg, 2008, pp. #522-pp. #530.

Steyvers, "Probabilistic Topic Models", In Handbook of Latent Semantic Analysis, 2007, vol. 22, Issue 7, 15 pgs.

Waal et al., "Topic Models applied to Multilingual Data", 2007, retrieved at <<http:prasa.org/proceedings/2007/prasa07-13.pdf>>, 6 pages.

Wang et al., "Mining Correlated Bursty Topic Patterns from Coordinated Text Streams," KDD'07, Aug. 12-15, 2007, San Jose, California, USA, 10 pages.

Wayne, "Multilingual Topic Detection and Tracking: Successful Research Enabled by Corpora and Evaluation", In the Proceedings of the Second International Language Resources and Evaluation Conference, 2000, 7 pgs.

* cited by examiner

MINING MULTILINGUAL TOPICS

CROSS-REFERENCES TO RELATED APPLICATIONS

This application is a continuation application of, and claims priority to, co-pending, commonly owned U.S. patent application Ser. No. 12/760,844, filed Apr. 15, 2010, which is incorporated herein in its entirety by reference.

BACKGROUND

The web is becoming less dominated by English-language content and English-speaking users. One challenging but very desirable task accompanying web growth is to analyze and organize web content written in different languages, to make it easily accessible for all users. Some work has been conducted to help achieve this goal, including research involving statistical machine translation. However, previous studies usually depend on bilingual/multilingual dictionaries or parallel corpora in which texts in one language and their translation in other language(s) are well aligned at word or sentence levels. Such dictionaries and corpora are usually constructed by human editors, are domain specific, and are expensive to scale up, which will restrict such research work from being adapted to many languages and domains.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the document.

This document describes a data mining technology to effectively analyze and organize web or other textual information written in different languages. The technology uses a multilingual topic modeling algorithm to extract universal topics from a large-scale and multilingual knowledge base such as Wikipedia, which is composed of multiple concept-units. Each concept-unit corresponds to a concept which is described by documents of different languages. The topic modeling algorithm assumes that documents within a single concept-unit share a common topic distribution. Each extracted universal topic is defined by a plurality of word distributions corresponding respectively to the different languages. All documents are represented by respective topic distributions in a common topic space using a group of the universal topics. A comparison of topic distributions of different documents in different languages determines the relationship between such documents and makes various multilingual web applications feasible.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

The disclosure describes a technique for organizing, classifying, and locating written content in different languages, and for performing other cross-lingual tasks. The technique utilizes a multi-language, hyperlinked document corpus, in which documents are organized or aligned by concept. Each concept corresponds to a set of documents in different languages. Topic modeling techniques are used to determine topics of the documents, with the constraint that all the documents corresponding to a particular concept, regardless of language, are assumed to share a common topic distribution. The result is a universal topic space specifying a plurality of universal topics. Each universal topic is defined by a plurality of topic/word distributions, corresponding to the different languages of the multi-language document corpus, indicating the words likely to appear in relation to that universal topic. Once defined in this manner, new documents can be compared to the universal topic space for various multi-lingual applications such as document comparison, document recommendation, document classification using a pre-classified corpus, etc.

Figure 1:
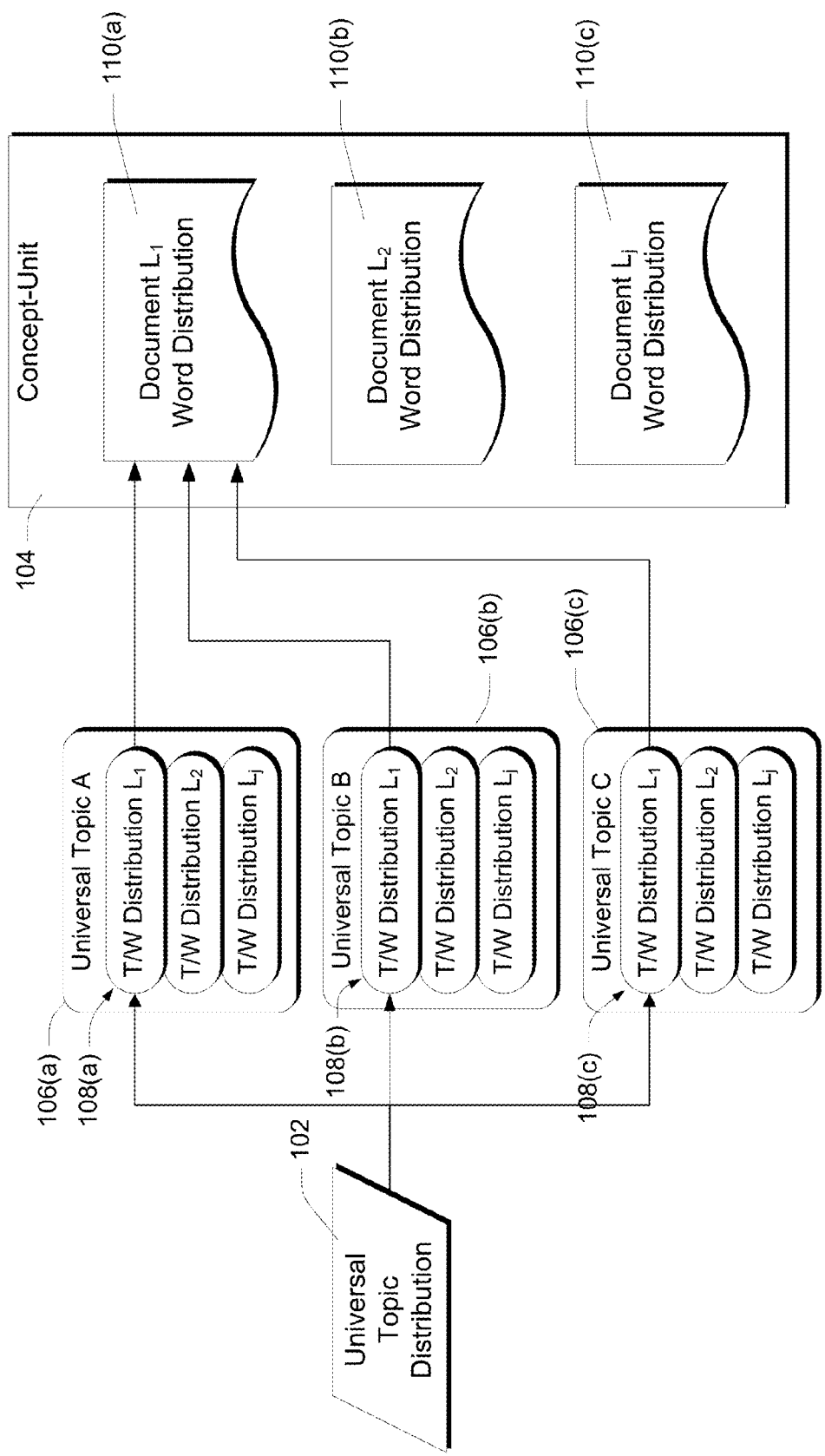
FIG. 1 illustrates, for purposes of modeling, how documents of a concept-unit are assumed to have been created.
Figure 2:
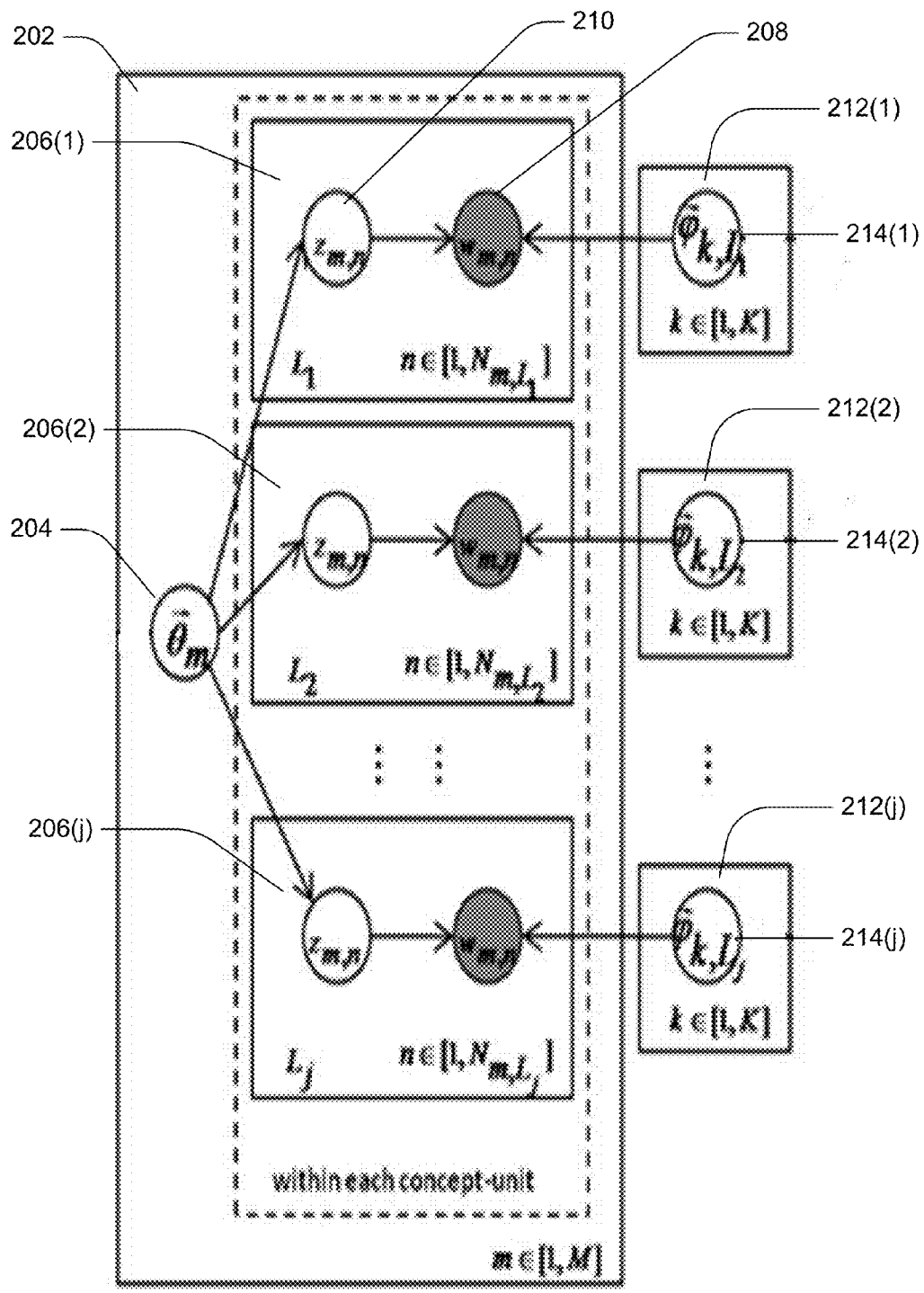
FIG. 2 illustrates a model that assumes documents have been created in accordance with the hypothetical process of FIG. 1.

FIGS. 1 and 2 illustrate how a topic space can be modeled in relation to documents of a multi-language, document-aligned corpus. A document-aligned corpus is a document corpus in which there are identified sets of documents in different languages that have some subject matter commonality. This contrasts with word-aligned, sentence-aligned, or paragraph-aligned corpuses, in which smaller grammatical units are mapped directly to each other, and thus from one language to another.

A document-aligned corpus can be obtained or generated from online sources such as online multi-lingual encyclopedias. Wikipedia is an example of such an online, multi-lingual encyclopedia. Multi-lingual encyclopedias contain sets of articles or documents, in different languages, describing various subjects or concepts. Specifically, each subject or concept corresponds to a set of articles or documents, referred to herein as a concept-unit, describing that subject or concept.

FIG. 1 illustrates, for purposes of modeling, how the documents of a concept-unit are assumed to have been created. FIG. 2 illustrates a model that assumes documents have been created in accordance with the hypothetical process of FIG. 1. Note that the figures describe a hypothetical document creation process in which documents are generated from an existing topic space. In practice, documents are not actually created using this process, and the topic space in fact has not been defined at the time of document creation. However, modeling the process in this manner allows subsequent definition or "discovery" of the topic space.

The model assumes that there are documents corresponding to different concept-units, and that each concept-unit has a corresponding set of documents in languages $L_1$ through $L_j$. Using a "bag-of-words" simplification, in which the order of words within a document is disregarded, the model assumes the existence of a topic space defined by a plurality of topics. Each topic is defined as plurality of topic/word (T/W) distributions corresponding respectively to languages $L_1$ through $L_j$. Each topic/word distribution indicates the probability of any particular word occurring in the corresponding topic.

The model assumes that the documents of a concept-unit are created in each of languages $L_1$ through $L_j$ using a common topic distribution. That is, all of the documents within a single concept-unit, regardless of language, are generated using the same universal topic distribution.

Referring to FIG. 1, the model assumes that a universal topic distribution 102 specifies the relative percentages of different universal topics that the documents of a concept unit 104 are to contain. This example illustrates three universal topics, 106(a), 106(b), and 106(c). It is also assumed that each topic 106 has or defines a topic/word distribution 108 corresponding to each available language. In this example, each topic 106 has a topic/word distribution 108 corresponding to language $L_1$, language $L_2$, . . . , and language $L_j$. Each topic/word distribution 108 specifies the relative probability of individual words appearing in a document having that topic.

The model further assumes that documents have been generated in accordance with the given topic distribution 102 and the corresponding topic/word distributions 108 of the appropriate language. This results in documents in each language, having respective word distributions or counts. For example, a document 110(a) in language $L_1$ is represented by a word distribution in language $L_1$, which is generated in accordance with topic distribution 102 and topic/word distributions 108(a), 108(b), and 108(c) of the same language $L_1$ from each of the corresponding specified topics 106(a), 106(b), and 106(c). Similarly, although these relationships are not explicitly shown in FIG. 1, a document 110(b) in language $L_2$ is represented by a word distribution in language $L_2$, which is generated in accordance with topic distribution 102 and topic/word distributions 108(a), 108(b), and 108(c) of the same language $L_2$ from each of the corresponding specified topics 106(a), 106(b), and 106(c). A document 110(c) in language $L_j$ is represented by a word distribution in language $L_j$, which is generated in accordance with topic distribution 102 and topic/word distributions 108(a), 108(b), and 108(c) of the same language $L_j$ from each of the corresponding specified topics 106(a), 106(b), and 106(c).

Though FIG. 1 shows only a single concept-unit and topic distribution, it is assumed for purposes of the following discussion that there is a large number of concept-units and corresponding topic distributions. This situation can be more effectively modeled using a plate diagram, as will be discussed with reference to FIG. 2.

In practice, most of the parameters of this process are not explicitly known. For example, the topics, topic distributions, and topic/word distributions are not known. In fact, only the actual word distributions of the individual documents can be directly observed. The other parameters can only be inferred. Procedures for inferring theses parameters will be described below.

FIG. 2 is a plate model further illustrating the relationships introduced with reference to FIG. 1. An outer plate 202 represents variables relating to individual concepts-units m. These include a topic distribution $\theta_m$ 204 for each concept-unit m. The topic distribution corresponding to a particular concept-unit indicates the topics of that concept-unit and the relative significance of each topic within the concept-unit. For example, a particular concept-unit might have a topic distribution of 20% "Internet" and 80% "Computer".

Each concept-unit has a plurality of documents in different languages. FIG. 2 shows inner plates 206(1) through 206(j), corresponding respectively to the individual documents of a particular concept-unit m, and also corresponding to the different document languages $L_1$ through $L_j$. Each inner plate 206 represents the variables associated with the individual words of the corresponding document, which are repeated for each different concept-unit. These variables include word $w_{m,n}$ 208, which is the $n^{th}$ word of the document in concept m, and a topic $z_{m,n}$ 210, which is the topic of the $n^{th}$ word of the document in concept m.

There are plates 212(1) through 212(j) corresponding respectively to inner plates 206(1) through 206(j). Plates 212 represent individual topics, corresponding to languages $L_1$ through $L_j$. Each topic is defined by a word distribution $\varphi_{k,L_j}$ 214. Each word distribution corresponds to a topic k and a language $L_1$, and indicates the relative probability of each word occurring in an individual topic.

As noted above, the only variable actually observable by the available document corpus is $w_{m,n}$. Other parameters can be inferred. A multi-lingual LDA (ML-LDA) technique will be described below, but it should be understood that other techniques can also be used to infer these parameters.

Figure 3:
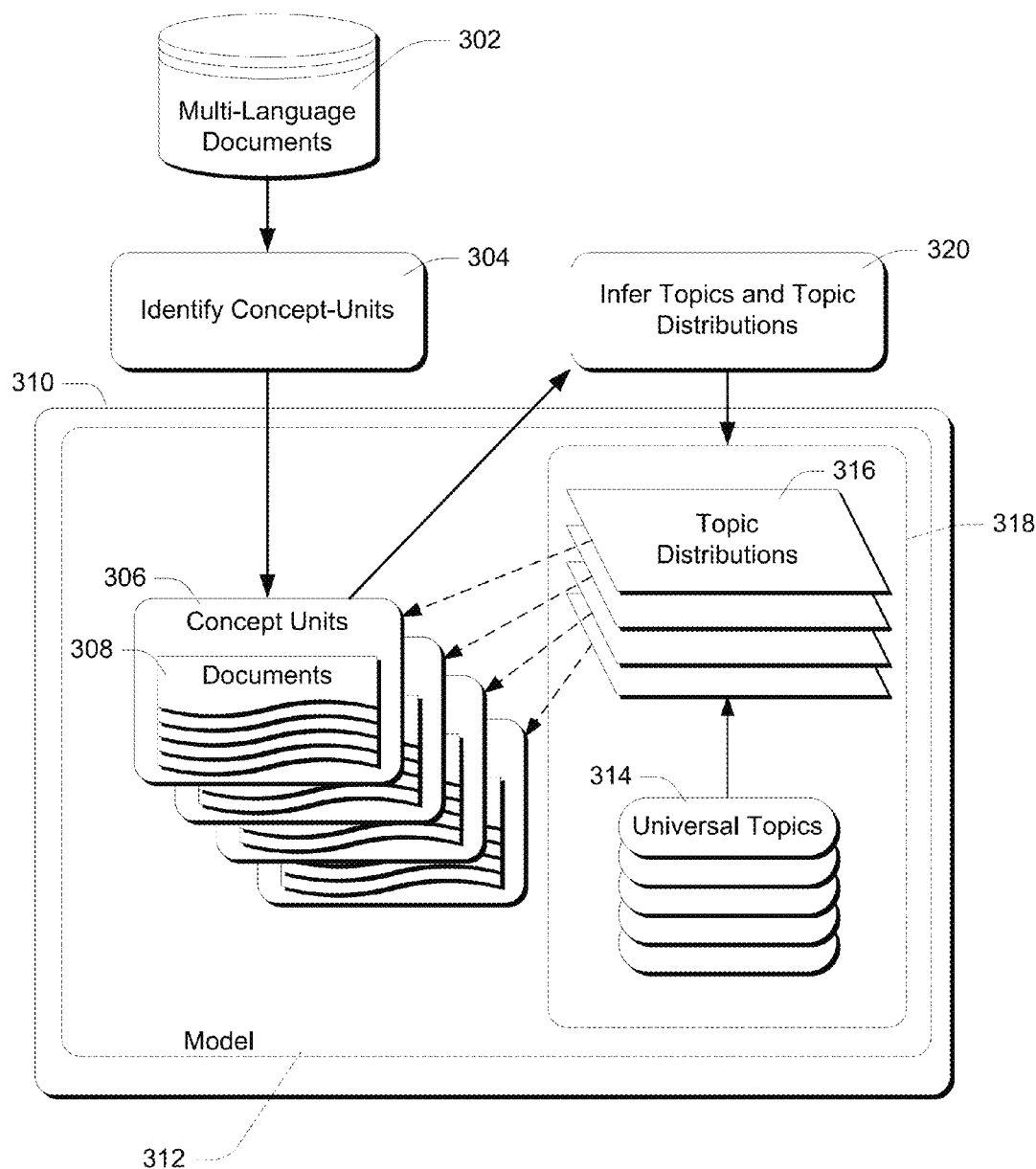
FIG. 3 illustrates an exemplary method of creating a topic space.

FIG. 3 illustrates a method of creating a topic space in accordance with the techniques described above. The method uses an indexed, multi-language document corpus 302. Multi-language document corpus 302 can be a web-based collaborative multilingual encyclopedia such as the Wikipedia or some similar body of articles from which documents of different languages can be aligned with each other according to their subject matter.

An action 304 comprises identifying concepts or concept-units from the indexed document source 302. In some embodiments, this comprises identifying, extracting, or examining hyperlinks of a particular document that identify other documents in other languages relating to a common concept. Each document typically contains hyperlinks or references to documents in different languages dealing with the same concept. All documents discussing the same concept are thus cross-linked with each other. By examining these cross-links, the documents can be grouped into concept-units. Each concept-unit includes a set of documents in different languages describing a particular concept. For purposes of discussion, several concept-units 306 are represented in FIG. 3, along with their constituent documents 308.

An action 310 comprises modeling the concept-units 306 of the multi-language document corpus 302 to create a generative model 312 representing different parameters of a topic space relative to concept units 306. In particular, the model includes concept-units 306 and their documents 308, as well as a plurality of universal topics 314 and a topic distribution 316 corresponding to each concept-unit. As discussed above, each universal topic 314 is defined by a plurality of topic/word distributions corresponding respectively to the different languages. As also discussed above, the documents 308 of any single concept-unit 306 are constrained within the generative model to share a common topic distribution 316. Documents 308 within the generative model 312 are represented by word distributions or counts, indicating the frequencies of different words within respective documents.

Universal topics 314 and topic distributions 316 are referred to as latent parameters 318 because they are not directly observable. Rather, they can be inferred using techniques that will be described below.

An action 320 comprises inferring the plurality of universal topics from the documents 308 of the concept units 306, based on the generative model 312. As will be described, inferring 320 can be accomplished by performing a modified LDA analysis. Other Bayesian and statistical techniques might alternatively be used to infer universal topics 314 and topic distributions 316.

The following exemplary multilingual modeling uses Wikipedia as an exemplary multi-language document corpus and a modified Latent Dirichlet Allocation (LDA) technique as an exemplary multilingual topic modeling algorithm to build a multilingual model and to infer topic distributions and topic/word distributions. The resulting technique will be referred to as multi-lingual LDA (ML-LDA).

Wikipedia as an Exemplary Multi-Language Document Corpus

Wikipedia is an example of a multi-language document corpus that helps to organize Web content in different languages. Wikipedia has become a very large multilingual and Web-based encyclopedia. It currently contains more than 10 million articles in around 250 languages. In Wikipedia, each article describes a concept. Meanwhile, a concept is usually described in multiple languages, each language corresponding with one article or document. Thus Wikipedia can be regarded as a multilingual comparable corpus covering a large number of concepts, which are freely downloadable and frequently updated. For purposes of the following discussion, the set of documents corresponding to a particular concept will be referred to as a concept-unit.

Figure 4:
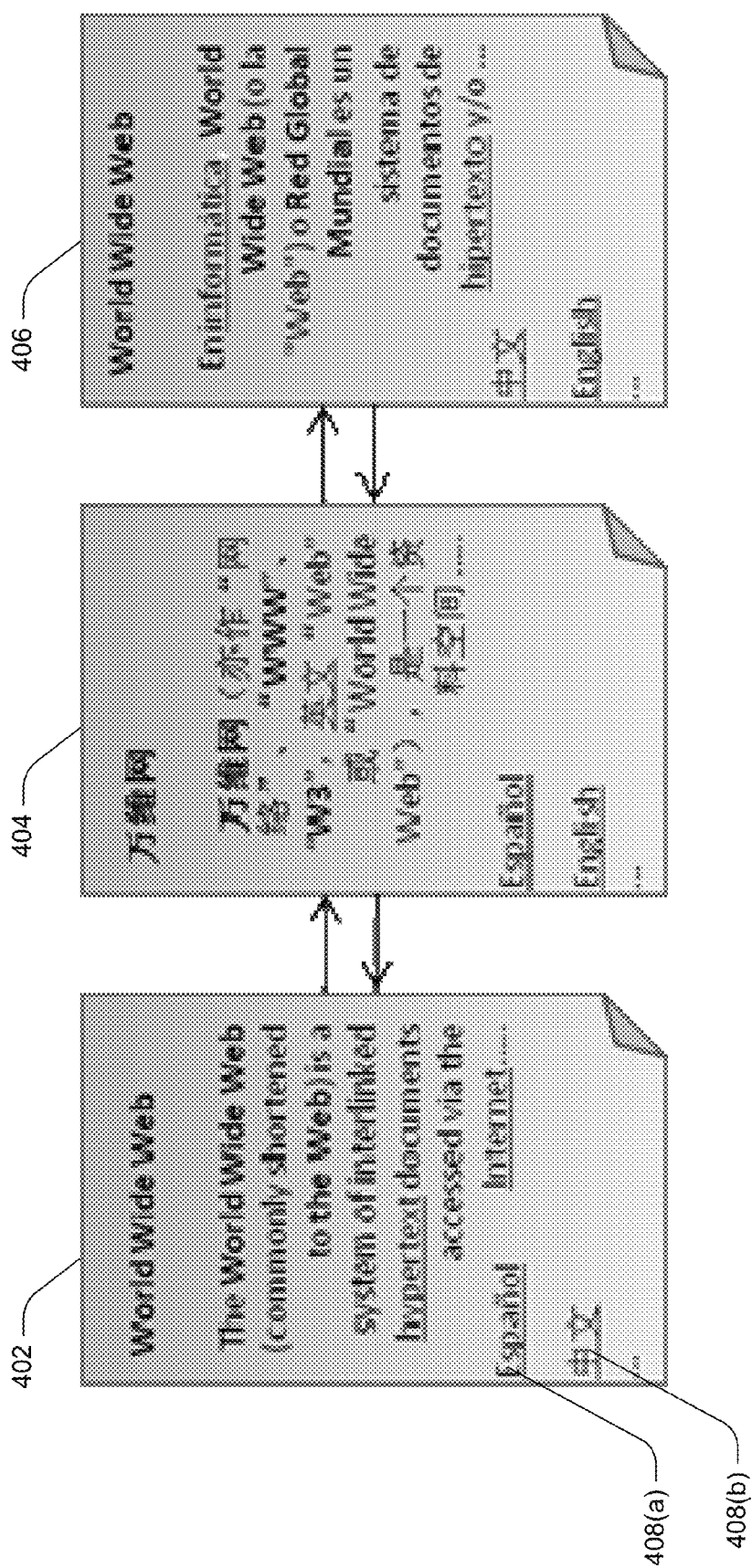
FIG. 4 shows an exemplary concept-unit corresponding to a concept "World Wide Web."

FIG. 4 shows an exemplary concept-unit corresponding to a concept "World Wide Web." Wikipedia includes 74 articles, webpages, or documents describing that concept, using the same number of languages. Simplified versions of three of these webpages or documents are shown in FIG. 4. A webpage 402 is an English description of the "World Wide Web" concept. A webpage 404 is a Chinese description of the "World Wide Web" concept. A webpage 406 is a Spanish description of the "World Wide Web" concept. Each document has hyperlinks 408 that link to other webpages of the same concept-unit. For example, hyperlink 408(a) links to webpage 406 and hyperlink 408(b) links to webpage 404 of the same concept "World Wide Web."

Topic modeling has been widely researched and used by various text applications. Typical topic modeling algorithms like Latent Semantic Analysis (LSA), Probabilistic Latent Semantic Analysis (PLSA) and Latent Dirichlet Allocation (LDA), are usually applied on a group of documents (represented by a term-by-document matrix) to extract latent topics. Each topic is represented by a set of words and each word corresponds with a weight or probability score used to measure its contribution to the topic. The philosophy behind topic modeling is to utilize word co-occurrence information for extracting document semantics. For example, if "ipod" and "iTunes" frequently co-occur in a set of documents, both words may have high scores in one topic.

However, such existing topic modeling algorithms cannot be directly used on multi-language Wikipedia data because such data involves multiple term-by-document matrices, each corresponding with one language.

The techniques described herein maintain separation of all term-by-document matrices of L different languages. Universal topics are used for modeling documents from different languages. The universal topics are inherently multilingual: each has L types of representations and each representation corresponds with one language. The links among Wikipedia documents describing the same concept are utilized to align topic representations: all the documents of a single concept-unit follow the constraint of sharing one common topic distribution. In other words, all documents of a single concept-unit are assumed to have same or substantially similar topics and topic distributions. Based on this unified modeling framework, new documents of different languages can be represented within the same vector space using the universal multilingual topics. As opposed to other methods, this approach does not require additional linguistic resources like dictionaries or translation tools.

Problem Formulation

The related concepts and tasks which will be used in the exemplary multilingual modeling are formally defined below.

Definition 1 (Concept-Unit): A Concept-unit c is a set of documents written in different languages but describing the same concept. Here, "concept" is a definition used by Wikipedia. For example, "World Wide Web" is a concept of Wikipedia. All documents about the "World Wide Web" concept compose a concept-unit. These documents are not aligned at word or sentence level. A concept-unit is denoted by $\{d_j\}_{j \in L}$, where $d_j$ is a document with index j; L denotes the set of languages associated with this concept.

Definition 2 (Document): A document $d_j$ of a concept-unit is a word sequence: $w_{1,j} w_{2,j} \ldots w_{|d|,j}$, where $w_{i,j}$, $1 \le i \le |d|$, is a word from a vocabulary, $W_j$, corresponding to language j. Similar to general topic modeling approach, a document will be represented by Bag-of-Word representation herein.

Definition 3 (Document-Aligned Comparable Corpus): A document-aligned comparable corpus, $\mathcal{D}$, is a collection of concept-units of Wikipedia or some similar source.

Definition 4 (Universal-Topic): A universal-topic is represented by a topic model $\theta$, where $\theta$ consists of one probabilistic word distribution for each language in L, $\{\{p(w|\theta)\}_{w \in W_j}\}_{l \in L}$. In addition, for any $l \in L$, there is $\Sigma_{w \in W_j} p(w|\theta) = 1$. Note that words in each language are separated to represent a universal-topic. In other words, one universal-topic has different word distributions for different languages.

It is common to use word distributions to represent topics in topic modeling research work. Intuitively, high probability values will be assigned to words which can well characterize the topic. For example, for the universal-topic "football", words like "football", "cup", "national", "season" and "league" may have high probability values. Its representation in Chinese language may have high probability values for word like "足球 (football)", "球员 (football player)", "联赛 (league matches)", "场 (matches)", "冠军 (champion)" and "俱乐部 (club)", etc. Although represented by different languages, both word distributions correspond with exactly one universal-topic.

Definition 5 (Multilingual Topic Modeling): Multilingual topic modeling is the task of modeling document-aligned comparable corpus $\mathcal{D}$ with a set of universal-topics $\{\theta_1, \theta_2, \ldots, \theta_k\}$.

Definition 6 (Multilingual Text Mining): Multilingual text mining is the task of doing text mining with documents written in different languages.

Universal-topics extracted by multilingual topic modeling contain patterns applicable across different languages. They can be used to support various multilingual text mining applications. For example, the mapping relationship between words from different languages can be inferred from universal-topics. Such word mapping relations may be used in the same way as bilingual or multilingual dictionaries. What's more, texts written in different languages can be represented within a single vector space using universal-topics, through which cross-lingual text similarity can be calculated without any machine translation work. This capability will also facilitate many applications like cross-lingual text classification, cross-lingual information retrieval, etc.

Multilingual Topic Modeling

It is natural to adopt a generative approach to accomplish the multilingual topic modeling task defined above. The philosophy behind traditional topic modeling algorithms is to find latent structure of "topics" responsible for a set of observations such as words or terms in text corpora. However, existing topic modeling methods like PLSA and LDA cannot be borrowed and directly utilized for this task. There is clearly a need to extract topics from multilingual texts. At the same time, there is also a need to coordinate the extraction of topics from all monolingual corpora because the final universal-topics are related to each of them. The technique described below is based on a multilingual topic modeling method called Latent Dirichlet Allocation (LDA), which is a state-of-the-art topic model algorithm. But the method described herein can be easily adapted to other topic modeling approaches like LSA, PLSA, etc.

As an introduction, LDA is briefly described below. This will be followed by a description of how LDA can be modified to form ML-LDA, which can extract latent and multilingual topics from document-aligned comparable corpus. Finally, an algorithm for estimating ML-LDA based on Gibbs Sampling technology will be described.

Latent Dirichlet Allocation (LDA)

The following is a brief introduction to Latent Dirichlet Allocation (LDA). Most of the notations and functions will also be used in the subsequent discussion of ML-LDA.

Figure 5:
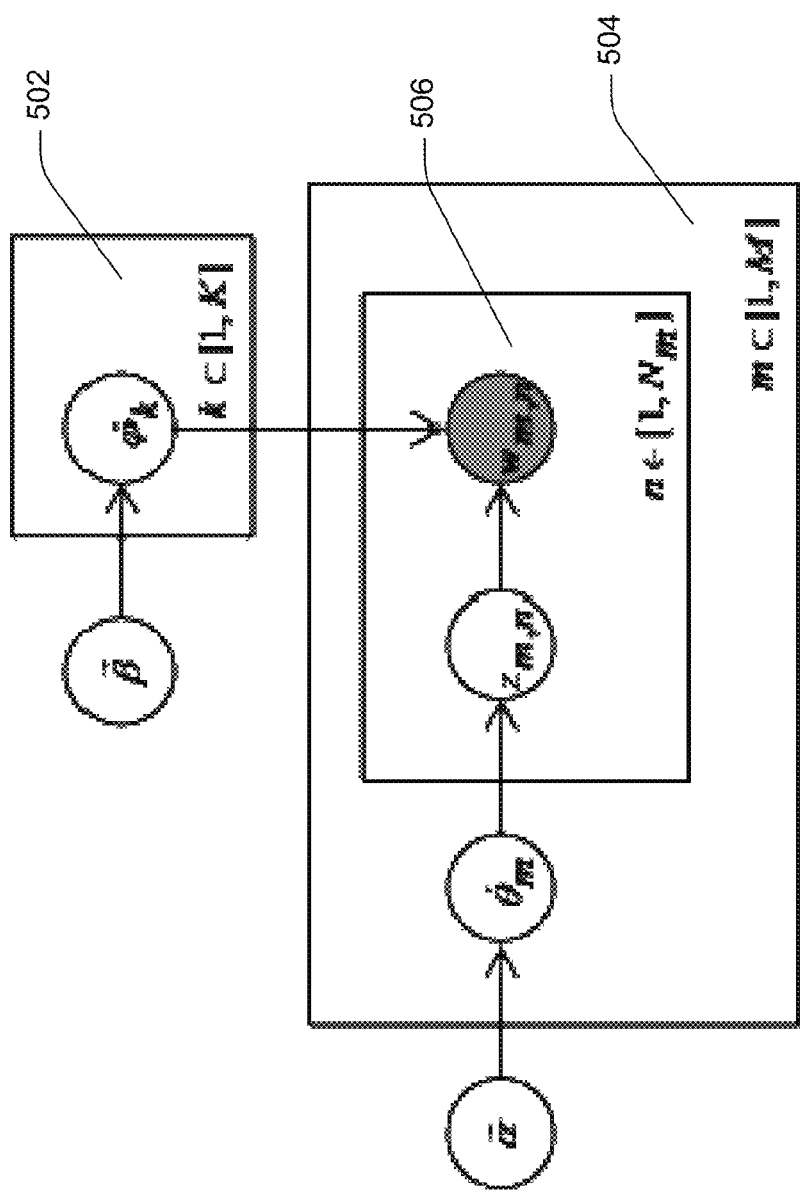
FIG. 5 shows a graphical model representation of Latent Dirichlet Allocation (LDA).

FIG. 5 shows a graphical model representation of LDA, which is a three-level hierarchical Bayesian model. A plate 502 represents individual topic k. A plate 504 represents variables relating to individual document m. A plate 506 corresponds respectively to the individual document m of a particular topic k.

Table 1 explains the notations of parameters in FIG. 5.

TABLE 1

Notations of LDA

K: the number of hidden (latent) topics
M: the total number of documents
$\vec{\alpha}, \vec{\beta}$: hyper parameters for Dirichlet distribution
$\vec{w}_m$: a particular document
$\vec{\theta}_m$: topic distribution for document m. $\Theta = \{\vec{\theta}_m\}_{m=1}^M$, M × K matrix.
$\vec{\varphi}_k$: word distribution for topic k. $\Phi = \{\vec{\varphi}_k\}_{k=1}^K$, K × V matrix.
$N_m$: the length of document m
$z_{m,n}$: topic index of the n-th word in document m
$w_{m,n}$: a particular n-th word in document m According to the generative graphical model depicted in FIG. 5, LDA has only two parameters $\vec{\alpha}$ and $\vec{\beta}$. Given these two Dirichlet parameters, the joint distribution of all known and hidden variables can be written as:

$$p(\vec{w}_m, \vec{z}_m, \vec{\theta}_m, \Phi | \vec{\alpha}, \vec{\beta}) = \quad (1)$$

$$p(\Phi | \vec{\beta}) p(\vec{\theta}_m | \vec{\alpha}) \prod_{n=1}^{N_m} p(w_{m,n} | \vec{\varphi}_{z_{m,n}}) p(z_{m,n} | \vec{\theta}_m)$$

By integrating over $\vec{\theta}_m$ and $\Phi$ and summing over $\vec{z}_m$, the marginal distribution of a document $\vec{w}_m$ can be obtained as:

$$p(\vec{w}_m | \vec{\alpha}, \vec{\beta}) = \int \int p(\Phi | \vec{\beta}) p(\vec{\theta} | \vec{\alpha}) \left( \prod_{n=1}^{N_m} \sum_{z=1}^K p(w_{m,n} | \vec{\varphi}_z) p(z | \vec{\theta}) \right) d\vec{\theta} d\Phi \quad (2)$$

Finally, the probability of generating a collection, $\mathcal{D} = \{\vec{w}_m\}_{m=1}^M$, can be obtained by taking the product of the marginal probabilities of all single documents as follows:

$$p(\mathcal{D} | \vec{\alpha}, \vec{\beta}) = \prod_{m=1}^M p(\vec{w}_m | \vec{\alpha}, \vec{\beta}) \quad (3)$$

The parameters of LDA can be estimated by maximizing the likelihood of the whole collection. Unfortunately, exact inference in such a model is intractable. Therefore, some approximate estimation approaches have been proposed, such as Variational EM and Gibbs Sampling. Gibbs Sampling is a special case of Markov-Chain Monte Carlo (MCMC) simulation and often yields relatively simple algorithms for approximation inference in high-dimensional models such as LDA. Application of Gibbs Sampling to the ML-LDA model will be described below.

Multilingual Latent Dirichlet Allocation (ML-LDA)

Figure 6:
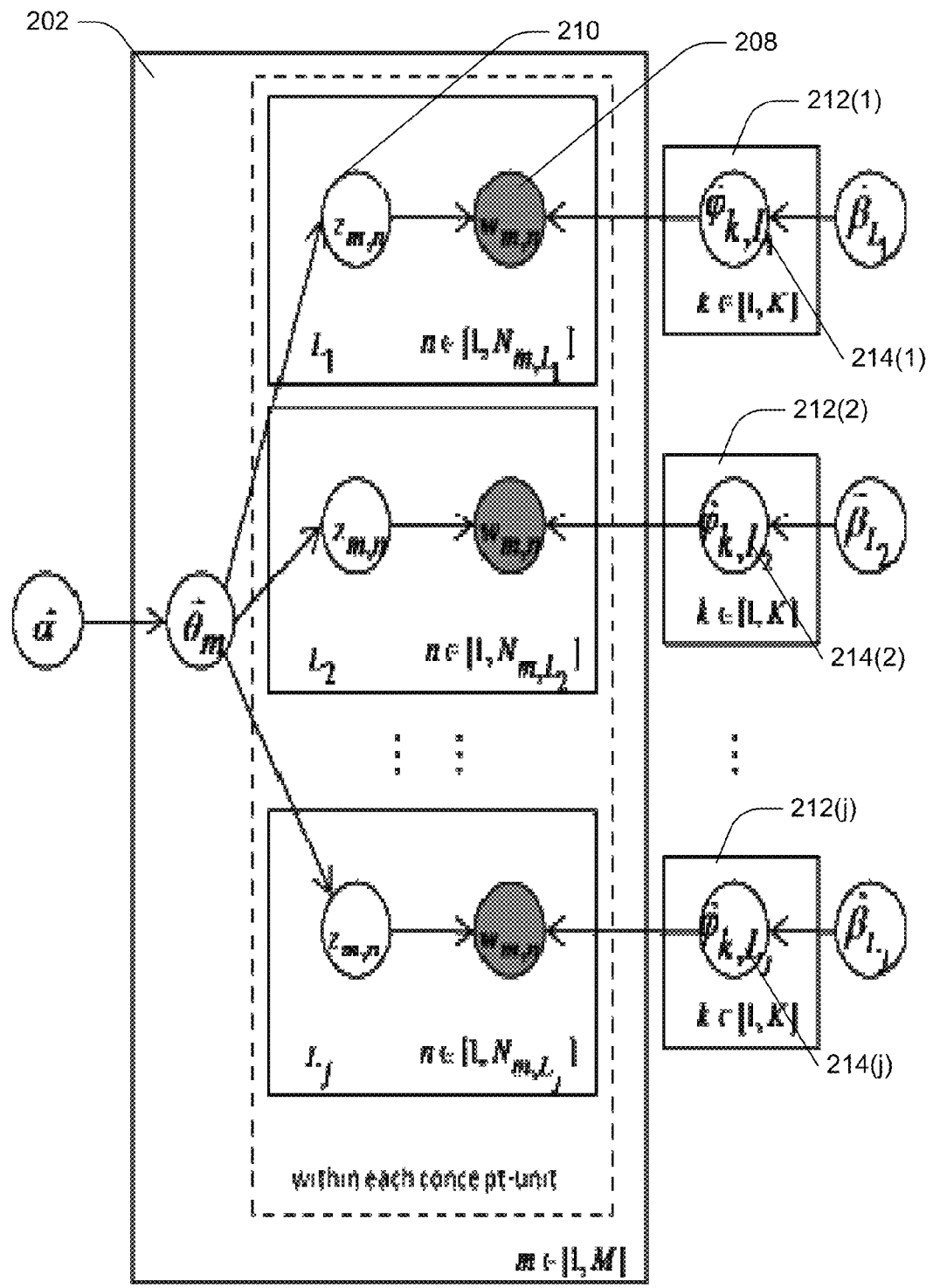
FIG. 6 shows a graphical model representation of Multi-lingual Latent Dirichlet Allocation (ML-LDA).

The Multilingual Latent Dirichlet Allocation (ML-LDA) model described herein assumes all the documents of a concept unit, although in different languages, share the same topic distribution. FIG. 6 presents a graphical model representation of ML-LDA.

Given a document-aligned comparable corpus, ML-LDA assumes that the generation process of the concept-units can be interpreted as follows:

For each universal-topic z, z = 1, 2, . . . , K.
  For each language j, j ∈ L
    Choose a word distribution $\vec{\varphi}_{z,L_j} \sim \text{Dir}(\vec{\beta}_{L_j})$
Then for each concept-unit $c_m$ in corpus D
  Choose distribution over universal-topics
  $\vec{\theta}_m \sim \text{Dir}(\vec{\alpha})$
  For each document $\vec{w}_{m,L_j} = \{w_{m,n,L_j}\}_{n=1}^{N_{m,L_j}}, j \in L$
    For each word $w_{m,n,L_j}$ in document $\vec{w}_{m,L_j}$
      Choose topic $z_{m,n} \sim \text{Mult}(\vec{\theta}_m)$
      Choose word $w_{m,n,L_j} \sim \text{Mult}(\vec{\varphi}_{z_{m,n},L_j})$ Here, Dir(•) and Mult(•) represent Dirichlet and Multinomial distributions respectively.

According to the process depicted in FIG. 6, ML-LDA has parameters $\vec{\alpha}$ and $\{\vec{\beta}_j\}_{j \in L}$. Given these Dirichlet parameters, the joint distribution of all known and hidden variables are written as:

$$p\left(c_m, \{\vec{z}_{m,j}\}_{j \in L}, \vec{\theta}_m, \{\Phi_j\}_{j \in L} \mid \vec{\alpha}, \{\vec{\beta}_j\}_{j \in L}\right) =$$

$$p(\vec{\theta}_m \mid \vec{\alpha}) \prod_{\vec{w}_{m,j}, j \in L} p(\Phi_j \mid \vec{\beta}_j) \prod_{n=1}^{N_{m,L_j}} p(w_{m,n,L_j} \mid \vec{\varphi}_{z_{m,n,L_j}}) p(z_{m,n,L_j} \mid \vec{\theta}_m)$$

where $c_m$ denotes concept-unit m and $\vec{w}_{m,j}$ denotes a document in language j of $c_m$, and L is the language set.

Similar to Equation 2, the marginal distribution of a concept-unit is obtained as:

$$p(\vec{c}_m \mid \vec{\alpha}, \{\vec{\beta}_j\}_{j \in L}) =$$

$$\int d\vec{\theta} p(\vec{\theta} \mid \vec{\alpha}) \prod_{\vec{w}_{m,j}, j \in L} \int d\Phi_j p(\Phi_j \mid \vec{\beta}_j) \prod_{n=1}^{N_{m,L_j}} \sum_{z=1}^{K} p(w_{m,n,L_j} \mid \vec{\varphi}_{z,L_j}) p(z \mid \vec{\theta})$$

In addition, the probability of the whole comparable collection, $\mathcal{D} = \{\vec{c}_m\}_{m=1}^M$, is obtained as follows.

$$p(\mathcal{D} \mid \vec{\alpha}, \vec{\beta}) = \prod_{m=1}^M p(\vec{c}_m \mid \vec{\alpha}, \{\vec{\beta}_j\}_{j \in L})$$

ML-LDA Estimation

This section presents a modification of Gibbs Sampling method for the estimation of ML-LDA. Gibbs Sampling is a method of producing a sample from a joint distribution when only conditional distributions of each variable can be efficiently computed. In Gibbs Sampling, the assignment of values to variables is reached by sequentially sampling all variables from their distribution conditioned on the current values of all other variables.

In order to apply Gibbs Sampling, we need to compute the conditional probability $p(z_{c,i,L_j} = k \mid \vec{Z}_{\neg(c,i),L_j}, \vec{W}_{L_j})$, where $\vec{w}_{L_j}$ denotes the vector of all words in language $L_j$ of the whole data collection $\mathcal{D}$ and $\vec{z}_{L_j}$ denotes their topic assignments; $\vec{Z}_{\neg(c,i),L_j}$ denotes the vector of topic assignment except the considered word at position I in the document item written in language $L_j$ of concept c. For a particular word t in language $L_j$ in position (c, i), this probability distribution can be derived as:

$$p(z_{c,i,L_j} = k \mid \vec{z}_{\neg(c,i),L_j}, \vec{w}_{L_j}) = \frac{n_{k,\neg(c,i),L_j}^t + \beta_{L_j}^t}{\sum_{v=1}^{V_{L_j}} (n_{k,L_j}^v + \beta_{L_j}^v) - 1} \cdot \frac{n_{m,\neg(c,i)}^k + \alpha_k}{\sum_{p=1}^K (n_m^p + \alpha_p) - 1}$$

where $n_{k,\neg(c,i),L_j}^t$ is the number of times word t in language $L_j$ is assigned to topic k except t's current assignment;

$$\sum_{v=1}^{V_{L_j}} n_{k,L_j}^v - 1$$

is the total number of words in language $L_j$ assigned to topic k except t's current assignment; $V_{L_j}$ is the vocabulary size of language $L_j$; $n_{m,\neg(c,i)}^k$ is the number of words in concept-unit m assigned to topic k except t's current assignment; $\Sigma_{p=1}^K n_m^p - 1$ is the total number of words in concept-unit m except the current word t.

Then it can obtain the multinomial parameter sets $\Theta$ and $\{\Phi_j\}_{j \in L}$:

$$\theta_{m,k} = \frac{n_m^k + \alpha_k}{\sum_{p=1}^K (n_m^p + \alpha_p)}$$

$$\varphi_{k,t,L_j} = \frac{n_{k,L_j}^t + \beta_{L_j}^t}{\sum_{v=1}^{V_{L_j}} (n_{k,L_j}^v + \beta_{L_j}^v)}$$

Exemplary Empirical Study: Multilingual Topic Modeling with ML-LDA

This section describes an exemplary empirical study of the effectiveness of ML-LDA for the multilingual topic modeling task on Wikipedia comparable corpus.

Input: Document-aligned Comparable Corpus Constructed from Wikipedia

For experiment purpose, a first step is to build a document-aligned comparable corpus from Wikipedia. A second step is to filter this data set and keep 77,390 concept-units which are written in either English or Chinese language. This sub-collection covers the concepts of quite diverse categories, including sport, business, computer science, military, internet and health, etc. In Wikipedia, each concept can belong to more than one category. It is reasonable to regard this sub-collection corpus as a broad bilingual knowledge base written in English and Chinese languages. Before topic modeling analysis, this exemplary empirical study preprocesses this data set by changing all words into lower case and removing all stop-words. Although this exemplary empirical study runs experiments on a bilingual corpus, the ML-LDA model is general enough and can be easily applied on multilingual corpus without additional efforts.

Output: Universal-topics

After the Wikipedia corpus described in the previous section is ready, the exemplary empirical study applies ML-LDA on it for extracting universal-topics. The exemplary empirical study sets the hyper parameters alpha and beta to be 0.5/K and 0.1 respectively, where K is the number of universal-topics. The exemplary empirical study experimented ML-LDA with K ranging from 50 to 600, with 50 as the step size. For each value of K, the model is estimated using 200 Gibbs Sampling iterations. According to the experiments, the exemplary empirical study found the extracted universal-topics quite meaningful and not very sensitive to the K parameter.

Table 2 shows some example universal-topics produced by ML-LDA algorithm with K=400. Each universal-topic has two representations: the first line corresponds with the distribution of Chinese words and the second line is associated with English word distribution. Words on each line are ranked by probability score in decreasing order (we omit probability values for better readability). The extracted topics really make sense: a nice "topic" level translation can be constructed with them. Taking the 31st universal-topic as an example, it is nicely represented by English words like football, team and cup, and also by Chinese words like 足球, 球队 and 杯. This indicates that ML-LDA has maintained the advantage of traditional topic modeling methods: it is able to well capture the semantic relationships between words. At the same time, it can also capture such semantic patterns between words in different languages. Another observation is that the extracted universal-topics are quite diverse with respect to their meanings. This is consistent with an assumption that the document-aligned Wikipedia corpus has a broad coverage of knowledge.

Table 2 lists the most likely words of 10 sample universal-topics produced by ML-LDA.

TABLE 2

Topic 1st: 宇宙(universe) 理论(theory) 相对论(principle of relativity) 引力(gravitation) 重力(gravity) 规测 (observation) 大(big) . . .
universe black relativity theory matter time gravitational einstein light hole general s gravity space physics big dark . . .
Topic 31st: 足球(football) 年(year) 球(ball) 球员(football player) 会(association) 场(match) 後(back) 俱乐部 (club) 盃(cup) . . .
football team cup national season world c league scored goals player f goal club match played england united fifa uefa . . .
Topic 33rd: 系统(system) 计算机(computer) 电脑(computer) 控制(control) 软件(software) 计算(compute) 机 (machine) . . .
system systems computer software s computers control operating computing program data hardware programs machine . . .
Topic 36th: 演(play) 戏(play) 游戏(game) 玩家(player) 系列(series) 机(machine) 版(version) 玩(play) 开发 (development) 作(do) . . .
game games video player released nintendo computer version players playstation console gaming series original mario . . .
Topic 95th: 电脑(computer) 机(machine) 苹果(apple) 使用(use) 碟(disk) 公司(company) 型(class) 硬(hard) 器 (devices) . . .
apple computer drive disk devices pc device memory ibm hard flash sony storage digital computers drives usb personal . . .
Topic 154th: 店(store) 家(merchant) 广告(ad) 间(room) 市场(market) 商店(store) 分店(sub-store) 於(about) 商 (business) . . .
stores store products sales marketing sold market product advertising chain brand items customers retail business goods . . .
Topic 200th: 年(year) 陆军(army) 月(month) 军(army) 军事(military) 日(day) 元帅(marshal) 人物(figure) 勋章 (honor) 将军(general) . . .
army general military war commander officer command rank staff chief lieutenant served promoted colonel officers . . .
Topic 208th: 教育(education) 学习(study) 儿童(children) 学生(student) 学校(school) 知识(knowledge) 教学 (education) 课程(class) . . .
children education learning child educational reading students knowledge learn teaching parents skills age study . . .
Topic 210th: 石油(petroleum) 油(oil) 能源(energy sources) 电力(electric power) 燃料(fuel) 天然气(natural gas) . . .
oil energy power gas fuel production natural petroleum electricity emissions coal wind carbon plant plants diesel . . .
Topic 213th: 经济(economic) 政府(government) 政策(policy) 发展(development) 贸易(trade) 国家(country) 农 业(agriculture) . . .
economic economy government trade tax policy growth system countries workers industry labor foreign income . . .

Exemplary Multilingual Text Mining Applications

Doing multilingual topic modeling analysis with ML-LDA results in numerous opportunities for various multilingual text mining applications. The ML-LDA topic modeling allows texts written in different languages to be represented by a single universal-topic space. With such representation, additional resources such as dictionaries or machine translation tools are not required when calculating cross-lingual similarity. In addition, universal-topics extracted from Wikipedia convey multilingual knowledge of various domains. This motivates designers to leverage universal-topics to help many cross-lingual applications.

Topic Inference

After universal-topics are discovered by ML-LDA model, they can be used to derive a universal topic space. The topic distribution of a text document d in any language L can be inferred through Gibbs Sampling.

Let $\vec{w}_{L_j}^d$ denotes the Bag-of-Words vector of document d. The topic assignment for a particular word t in $\vec{w}_{L_j}^d$ depends on the current topics of all other words in $\vec{w}_{L_j}^d$ and the topics of all words in $\vec{w}_{L_j}$ (the words in the document-aligned comparable corpus in language $L_j$):

$$p\left(z_{i,L_j}^d = k \mid \vec{z}_{\to i,L_j}^d, \vec{w}_{\to i,L_j}^d, \vec{z}_{L_j}, \vec{w}_{L_j}\right) =$$

-continued $$\frac{n_{k,L_j}^t + \beta_{L_j}^t n_{\to i,k,L_j}^{d,t}}{\sum_{v=1}^{V_{L_j}} \left(n_{k,L_j}^v + \beta_{L_j}^v n_{k,L_j}^{d,v}\right) - 1} \frac{n_{\to i}^{d,k} + \alpha_k}{\sum_{p=1}^{K} (n^{d,p} + \alpha_p) - 1}$$

where $n_{\to i,k,L_j}^{d,t}$ is the number of times t is assigned to topic k in d except t's current assignment; $n_{\to i}^{d,k}$ is the number of words in d assigned to topic k except t's current assignment.

Then the topic distribution of the new document d can be obtained as $\vec{\theta}^d = \{\theta_1^d, \theta_2^d, \ldots, \theta_K^d\}$ within the universal topic space with each component computed by:

$$\theta_k^d = \frac{n^{d,k} + \alpha_k}{\sum_{p=1}^{K} (n^{d,p} + \alpha_p)}$$

After dong topic inference, d can be represented as $\vec{d} = \{\theta_1, \theta_2, \ldots, \theta_K\}$. The following applications will be based on documents with such representation.

Cross-lingual Text Classification

Assume that there is a need for a text classifier to classify documents of language A. A potential problem is that there is no labeled data for training the classifier. However, there is available labeled data written in language B. To solve the problem, the universal topics discovered from Wikipedia can be a bridge for connecting documents in both languages.

Figure 7:
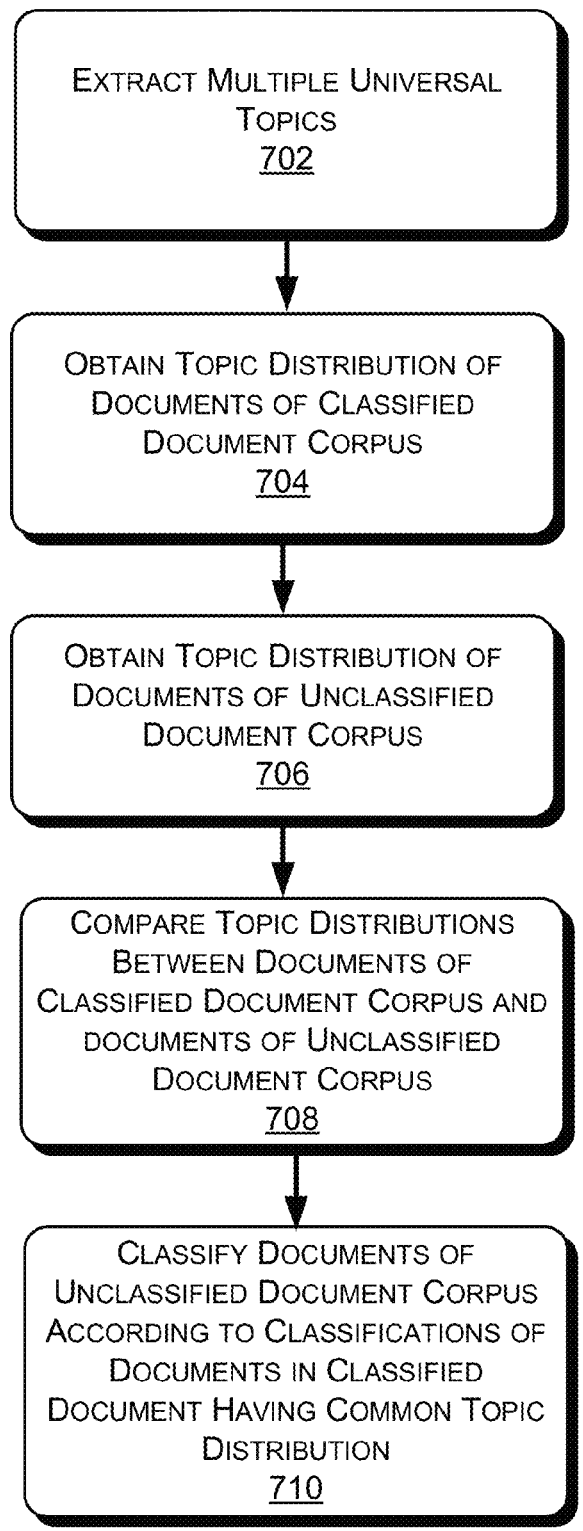
FIG. 7 shows an exemplary procedure of using documents of a classified document corpus to classify documents of an unclassified document corpus.

FIG. 7 shows an exemplary procedure of using a classified document corpus to classify an unclassified document corpus.

An action 702 comprises extracting multiple universal topics from the unlit-lingual document corpus, such as Wikipedia, as described above.

An action 704 comprises obtaining topic distribution of documents of a classified document corpus.

An action 706 comprises obtaining topic distribution of documents of an unclassified document corpus. This can be accomplished by comparing an unclassified document in a given language to the topic word distributions corresponding to the given language to estimate a topic distribution of the unclassified document. In some cases, it also comprises comparing new documents of a different language to identify one or more groups of the unclassified documents sharing common topic distributions.

An action 708 comprises comparing topic distributions between documents of the unclassified document corpus and documents of the classified document corpus.

An action 710 comprises classifying documents of the unclassified document corpus according to classifications of documents in the classified document corpus having common topic distribution.

For instance, it is feasible to obtain a topic distribution of the document to be classified (in language A) using the techniques described above. Then the topic distribution of the document to be classified (in language A) is compared to that of the labeled documents (in language B) to find one of the labeled documents (in language B) that has a same or substantially similar topic distribution as the document to be classified (in language A). The document to be classified (in language A) will have a same label as found labeled document (in language B).

After the labeled documents (in language B) and the documents to be classified (in language A) are represented by multilingual topics, there is no change to the process of traditional model training and classification.

Cross-lingual Document Recommendation

The scenario of this application is: when users are browsing documents, the system can recommend related documents written in other languages. This technology is also quite valuable for accessing/integrating the information written in different languages.

Based on the extracted universal-topics, new documents of different languages can be represented within one same space, the universal-topic space. With such representation, it is very flexible to calculate cross-lingual document similarity.

Figure 8:
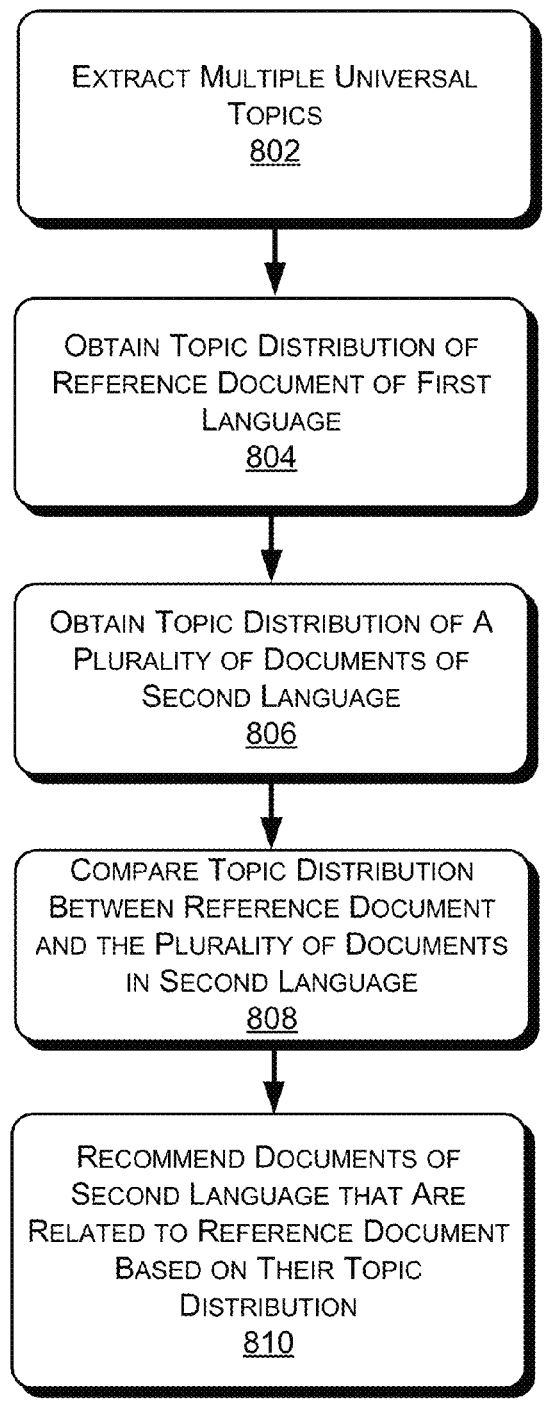
FIG. 8 shows an exemplary procedure of recommending related documents written in different languages.

FIG. 8 shows an exemplary procedure of commending related documents written in different languages.

An action 802 comprises extracting multiple universal topics from the unlit-lingual document corpus, such as Wikipedia, as described above.

An action 804 comprises obtaining topic distribution of a reference document of a first language.

An action 806 comprises obtaining topic distributions of a plurality of documents of a second language.

An action 808 comprises comparing topic distributions between the reference document in the first language and the plurality of document of the second language.

An action 810 comprises recommending documents of the second language that are related to the reference based on their topic distributions.

For example, assuming there are 2 universal-topics about "Music" (Topic-1) and "Sport" (Topic-2) respectively, there are 2 English documents, one talks about music (ENG-Doc-1) and the other talks about sport (ENG-Doc-2) and there also are 2 Chinese documents, one is about music (CHN-Doc-1) and the other is about sport (CHN-Doc-2). After topic inference, the 4 documents can be represented in the universal-topic space like ENG-Doc-1={Topic-1:0.9, Topic-2:0.1}, ENG-Doc-2={Topic-1:0.1, Topic-2:0.9}, CHN-Doc-1={Topic-1:0.8, Topic-2:0.2} and CHN-Doc-2={Topic-1: 0.2, Topic-2:0.8}. The value indicates the likelihood of a document belongs to a topic. With such representation, it is very easy to get that ENG-Doc-1 is related/similar to CHN-Doc-1 and ENG-Doc-2 is related/similar to CHN-Doc-2. Such representation will benefit various multilingual text mining applications like cross-lingual text classification and cross-lingual information retrieval, etc.

An Exemplary Computer Environment

Figure 9:
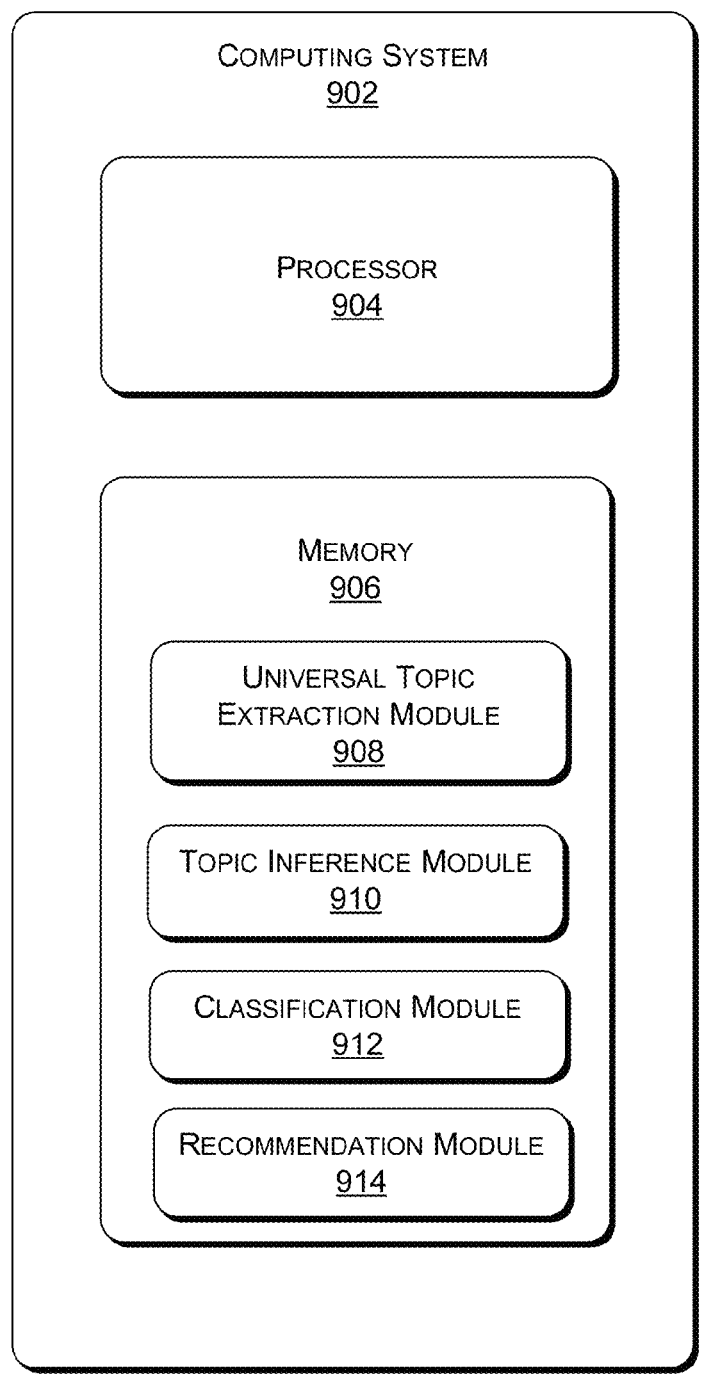
FIG. 9 illustrates an exemplary computing system.

FIG. 9 illustrates an exemplary computing system 902, which can be used to implement the techniques described herein, and which may be representative, in whole or in part, of elements described herein. Computing system 902 may, but need not, be used to implement the techniques described herein. Computing system 902 is only one example and is not intended to suggest any limitation as to the scope of use or functionality of the computer and network architectures.

The components of computing system 902 include one or more processors 904, and memory 906.

Generally, memory 906 contains computer-readable instructions that are accessible and executable by processor 904. Memory 906 may comprise a variety of computer readable storage media. Such media can be any available media including both volatile and non-volatile storage media, removable and non-removable media, local media, remote media, optical memory, magnetic memory, electronic memory, etc.

Any number of program modules or applications can be stored in the memory, including by way of example, an operating system, one or more applications, other program modules, and program data, such as a universal topic extraction module 908, a topic inference module 910, a classification module 912, and a recommendation module 914. Each of such program modules and program data (or some combination thereof) may implement all or part of the resident components that support the data mining of multilingual topic as described herein.

For example, universal topic extraction module 908 is configured to extract universal topics from the multilingual knowledge database, such as Wikipedia and define each of the universal topics by a plurality of topic word distributions corresponding relatively to different languages. Topic inference module 910 is configured to generate a topic distribution of a respective document in a given language by comparing its word distribution to the topic word distribution of the universal topics in the given language. Classification module 912 is configured to classify a new document according to classification of one or more documents in the classified document corpus having common topic distributions. Recommendation module 914 is configured to recommend related documents in different languages having common topic distributions.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method comprising:
identifying a concept-unit from a multi-language document corpus, the concept-unit including a set of documents in different languages describing a particular concept;
modeling the concept-unit identified from the multi-language document corpus to create a generative model, wherein the generative model represents at least:
  (a) a plurality of universal topics, individual ones of the plurality of universal topics being defined by a plurality of topic word distributions corresponding respectively to the different languages; and
  (b) a universal topic distribution associated with the concept-unit, the universal topic distribution identifying:
    (i) two or more universal topics for which documents describing the concept unit are to contain; and
    (ii) a relative significance of individual universal topics of the two or more universal topics within the concept unit; and
classifying a set of documents of an unclassified document corpus using the generative model, the classifying comprising:
obtaining the universal topic distribution for the set of documents of the generative model,
obtaining a topic distribution of the set of documents of the unclassified document corpus,
comparing the universal topic distribution to the topic distribution of the set of documents of the unclassified document corpus; and
based on the comparing, classifying one or more documents of the set of documents of the unclassified document corpus.

2. A method as recited in claim 1, further comprising inferring the two or more universal topics from the set of documents of the concept-unit based on the generative model, wherein the inferring comprises performing a latent Dirichlet allocation analysis.

3. A method as recited in claim 1, wherein the generative model further represents:
  (c) the concept-unit;
  (d) the set of documents; and
  (e) the plurality of topic word distributions.

4. A method as recited in claim 1, wherein the identifying the concept-unit comprises identifying hyperlinks within the set of documents that identify other documents in other languages relating to common concepts.

5. A method as recited in claim 1, wherein the universal topic distribution is a first universal topic distribution, and further comprising:
comparing a new document in a given language to the plurality of topic word distributions corresponding to the given language to estimate a second universal topic distribution of the new document;
determining, based at least partly on a comparison between the first universal topic distribution and the second universal topic distribution, that the new document describes the particular concept.

6. A method as recited in claim 1, further comprising comparing at least a first document and a second document to the plurality of topic word distributions to identify one or more groups of the documents sharing common topics, wherein the first document and the second document are not of the same language.

7. A method as recited in claim 1, further comprising generating a recommendation using the generative model, the generating the recommendation comprising:
obtaining a topic distribution of a reference document of a first language;
obtaining a topic distributions of a plurality of documents of a second language;
comparing the topic distributions between the reference document of the first language and the plurality of documents of the second language to identify topics of the documents; and
recommending at least a first document of the second language that is related to the reference document based on its identified topics.

8. A method comprising:
identifying a concept-unit from a multi-language document corpus, the concept-unit including a set of documents in different languages describing a particular concept;
inferring a universal topic distribution associated with the particular concept, the universal topic distribution identifying:
  (i) two or more universal topics for which individual documents describing the particular concept are to contain; and
  (ii) one or more significance values, wherein individual significance values represent a significance of a corresponding universal topic of the two or more universal topics within the particular concept; and
classifying a set of documents of an unclassified document corpus, the classifying comprising:
obtaining the universal topic distribution for the set of documents of the concept-unit,
obtaining a topic distribution of the set of documents of the unclassified document corpus,
comparing the universal topic distribution to the topic distribution of the set of documents of the unclassified document corpus; and
based on the comparing, classifying one or more documents of the set of documents of the unclassified document corpus.

9. A method as recited in claim 8, wherein the inferring the universal topic distribution comprises performing a Gibbs Sampling.

10. A method as recited in claim 8, further comprising inferring a plurality of universal topics from the concept-unit, each of the universal topics of the plurality of universal topics being defined by a plurality of topic word distributions corresponding respectively to the different languages, and wherein the inferring the universal topic distribution comprises performing a latent Dirichlet allocation analysis while constraining the set of documents within the concept-unit to share a common topic distribution.

11. A method as recited in claim 10, wherein the identifying the concept-unit from the multi-language document corpus comprises identifying hyperlinks within individual documents of the set of documents that identify other documents in other languages relating to common concepts.

12. A method as recited in claim 10, further comprising comparing a new document in a given language to a subset of the plurality of topic word distributions corresponding to the given language to estimate a topic distribution of the new document.

13. A method as recited in claim 10, further comprising comparing at least a first new document and a second new document to the plurality of topic word distributions to identify one or more common topics, wherein the first new document and the second new document are not of the same language.

14. A method as recited in claim 10, further comprising generating a recommendation using the generative model, the generating the recommendation comprising:
- obtaining a topic distribution of a reference document of a first language;
- obtaining a topic distributions of a plurality of documents of a second language;
- comparing the topic distributions between the reference document of the first language and the plurality of documents of the second language to identify topics of the documents; and
- recommending at least a first document of the second language that is related to the reference document based on its identified topics.

15. A method as recited in claim 10, wherein the inferring a plurality of universal topics comprises performing a latent Dirichlet allocation analysis.

16. At least one device comprising:
- one or more processors;
- memory storing instructions, that when executed on the one or more processors, configure the at least one device to perform operations comprising:
  - identifying multiple concept-units from a multi-language document corpus, a particular concept-unit of the multiple concept-units including a set of documents in different languages describing a particular concept;
  - deriving a universal topic space from the multiple concept-units;
  - identifying, based on the particular concept-unit and the universal topic space, a first topic distribution associated with the particular concept-unit, the first topic distribution comprising:
    (i) two or more topics of the universal topic space for which individual documents classified within the particular concept-unit are to contain; and
    (ii) one or more significance values, wherein individual significance values represent a significance of a corresponding universal topic of the two or more topics; and
  - analyzing a new document to place it within the universal topic space, wherein the analyzing comprises:
    - obtaining a second topic distribution of the new document, wherein the second topic distribution is based at least in part on the universal topic space;
    - comparing the second topic distribution of the new document with the first topic distribution associated with the particular concept-unit; and
    - classifying the new document within the universal topic space, based at least in part on the comparing.

17. At least one device as recited in claim 16, wherein deriving the universal topic space comprises inferring a plurality of universal topics from the multiple concept-units, each of the plurality of universal topics being defined by a plurality of topic word distributions corresponding respectively to the different languages.

18. At least one device as recited in claim 16, wherein identifying the multiple concept-units comprises identifying hyperlinks within individual documents of the set of documents that identify other documents in other languages relating to common concepts.

* * * * *